(12) United States Patent
Li et al.

(10) Patent No.: US 11,234,264 B2
(45) Date of Patent: Jan. 25, 2022

(54) METHOD AND APPARATUS FOR UPLINK TRANSMISSION IN A WIRELESS COMMUNICATION SYSTEM (71) Applicant: Telefonaktiebolaget LM Ericsson (publ), Stockholm (SE)

(72) Inventors: Gen Li, Beijing (CN); Rui Fan, Beijing (CN); Jinhua Liu, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/633,448

(22) PCT Filed: Aug. 8, 2017

(86) PCT No.: PCT/CN2017/096421
§ 371 (c)(1),
(2) Date: Jan. 23, 2020

(87) PCT Pub. No.: WO2019/028675
PCT Pub. Date: Feb. 14, 2019

(65) Prior Publication Data
US 2020/0221488 A1 Jul. 9, 2020

(51) Int. Cl.
*H04L 27/26* (2006.01)
*H04W 72/14* (2009.01)
(Continued)

(52) U.S. Cl.
CPC ......... *H04W 72/14* (2013.01); *H04L 27/2607* (2013.01); *H04W 74/0808* (2013.01); *H04W 80/08* (2013.01)

(58) Field of Classification Search
CPC . H04L 27/2607; H04L 5/0048; H04L 5/0053; H04L 5/0064; H04L 5/0091;
(Continued)

(56) References Cited

U.S. PATENT DOCUMENTS

2015/0011233 A1\* 1/2015 Kazmi ................ H04W 72/044
455/454
2016/0174259 A1 6/2016 Mukherjee et al.
(Continued)

FOREIGN PATENT DOCUMENTS

CN 106413096 A 2/2017
CN 106658718 A 5/2017

OTHER PUBLICATIONS

International Search Report and Written Opinion dated May 2, 2018 for International Application No. PCT/CN2017/096421 filed on Aug. 8, 2017, consisting of 8-pages.

*Primary Examiner* — Melvin C Marcelo
*Assistant Examiner* — Natali Pascual Peguero
(74) *Attorney, Agent, or Firm* — Christopher & Weisberg, P.A.

(57) ABSTRACT

Embodiments of the present disclosure provide methods, apparatuses and computer program products for enabling efficient uplink data transmission in a wireless communication system. A method implemented at a user equipment (UE) includes: receiving an uplink grant from a network node, the uplink grant indicating a granted resource associated with a plurality of channels; detecting availability of the plurality of channels; determining an uplink transmission parameter based on the uplink grant and a result from the detection; and transmitting data to the network node according to the determined uplink transmission parameter. Embodiments of the present disclosure may enable adaptive uplink transmission and increase uplink transmission opportunity.

18 Claims, 7 Drawing Sheets

(51) Int. Cl.
*H04W 74/08* (2009.01)
*H04W 80/08* (2009.01)

(58) Field of Classification Search
CPC ........................ H04L 5/0007; H04W 72/1268; H04W 72/14; H04W 74/0808; H04W 80/08; H04W 28/18; H04W 72/1289
USPC .................................................. 370/254, 329
See application file for complete search history.

(56) References Cited

U.S. PATENT DOCUMENTS

| | | |
|---|---|---|
| 2017/0034850 A1 | 2/2017 | Rico Alvarino et al. |
| 2017/0118766 A1 | 4/2017 | Baek et al. |
| 2018/0255578 A1* | 9/2018 | Kim .................. H04W 74/0808 |

* cited by examiner

METHOD AND APPARATUS FOR UPLINK TRANSMISSION IN A WIRELESS COMMUNICATION SYSTEM

CROSS-REFERENCE TO RELATED APPLICATIONS

This application is a Submission Under 35 U.S.C. § 371 for U.S. National Stage Patent Application of International Application Number: PCT/CN2017/096421, filed Aug. 8, 2017 entitled "METHOD AND APPARATUS FOR UPLINK TRANSMISSION IN A WIRELESS COMMUNICATION SYSTEM," the entirety of which is incorporated herein by reference.

TECHNICAL FIELD

The non-limiting and example embodiments of the present disclosure generally relate to a technical field of wireless communication, and specifically to methods, apparatuses and computer program products for uplink transmission in a wireless communication system.

BACKGROUND

This section introduces aspects that may facilitate better understanding of the disclosure. Accordingly, the statements of this section are to be read in this light and are not to be understood as admissions about what is in the prior art or what is not in the prior art.

In wireless communication systems, there is always a requirement for high throughput and large system capacity. For instance, mobile broadband communication will continue to drive for a large overall traffic capacity and a high achievable end-user data rate in a wireless access network. In addition, it has been envisaged that several scenarios in the future may require data rates of up to 10 Gbps in local areas. These demands for large system capacity and high end-user date rates may be met by a New Radio (NR) system.

In the NR system currently studied in the third-generation partnership project (3GPP), distances between access nodes may range from a few meters in indoor deployments up to roughly 50 meters in outdoor deployments. That is, an infra-structure of the NR system may be considerably denser than that of the densest networks of today. Furthermore, NR systems are also expected to operate on unlicensed bands besides traditional licensed exclusive bands, especially for enterprise solutions.

Both the dense deployment and the utilization of unlicensed bands bring challenges to operations of the NR system, and a topic about NR system implementations has been discussed in 3GPP as a study item from middle 2017.

SUMMARY

To enable efficient uplink data transmission in a wireless communication system (for example a NR system), methods, apparatuses and computer program products have been provided in the present disclosure. It will be appreciated that though some embodiments of the present disclosure are described with reference to the NR system or unlicensed bands, embodiments are not limited thereto, but could be more widely applied to any wireless communication system where similar problems exist.

Various embodiments of the present disclosure mainly aim at providing methods, apparatuses and computer program products for enable efficient uplink data transmission. Other features and advantages of embodiments of the present disclosure will be understood from the following description of various embodiments when read in conjunction with the accompanying drawings, which illustrate, by way of example, the principles of embodiments of the present disclosure.

In a first aspect of the disclosure, there is provided a method in a user equipment. The method comprises receiving an uplink grant from a network node, the uplink grant indicating a granted resource associated with a plurality of channels; detecting availability of the plurality of channels; determining an uplink transmission parameter based on the uplink grant and a result from the detection; and transmitting data to the network node according to the determined uplink transmission parameter.

In an embodiment, the availability of the plurality of channels may be detected by performing a mechanism based on carrier sensing or energy detection for each of the plurality of channels.

In another embodiment, the user equipment may determine the uplink transmission parameter further based on at least one of: information on a required guard band, information on whether uplink transmission using only a subset of the granted resource is enabled, and a subset of the granted resource allowed to be used for uplink transmission from the user equipment. In a further embodiment, the method may further comprise: obtaining, via the uplink grant or a higher layer signaling, at least one of: the information on a required guard band, the information on whether uplink transmission using only a subset of the granted resource is enabled, and the subset of the granted resource allowed to be used for uplink transmission from the user equipment.

In some embodiments, at least one of the information on the required guard band and the subset of the granted resource allowed to be used for uplink transmission are predefined. In still another embodiment, the required guard band is associated with transmission bandwidth for a transport block, and/or, specific to the user equipment.

In an embodiment, determining the uplink transmission parameter may comprise at least one of: determining a subset of the granted resource for uplink transmission of the user equipment; determining a number of transport blocks for the uplink transmission of the user equipment; and determining a transport block size, TBS, for the uplink transmission of the user equipment. In another embodiment, determining the subset of the granted resource may comprise: selecting the subset from a plurality of predefined subsets of the granted resource. In a further embodiment, determining the TBS may comprise determining the TBS based on a bandwidth of a determined subset of the granted resource for uplink transmission, or a ratio between the bandwidth of the determined subset and a total bandwidth of the granted resource.

In another embodiment, determining the TBS based on the bandwidth of the determined subset of the granted resource for uplink transmission may comprise: selecting a TBS associated with the bandwidth of the determined subset from a predefined mapping table, or obtaining the TBS based on a predefined function of the bandwidth of the determined subset.

In still another embodiment, the user equipment may determine the TBS by: obtaining an initial TBS associated with the granted resource from the uplink grant; and determining the TBS for the uplink transmission by multiplying the initial TBS with the ratio.

In some embodiments, the user equipment may further transmit a signal together with the data to the network node, and the signal may indicate at least part of the uplink transmission parameter. In another embodiment, the signal may indicate the at least part of the uplink transmission parameter via at least one of: a transmission format of the signal, a sequence associated with the signal, a cyclic shift associated with the signal, and an information field included in the signal.

In a second aspect of the disclosure, there is provided a method in a network node. The method comprises: transmitting an uplink grant to a user equipment, the uplink grant indicating a granted resource; determining a subset of the granted resource occupied by uplink transmission from the user equipment; and detecting the uplink transmission from the user equipment in the determined subset of the granted resource.

In an embodiment, the uplink grant may further comprise at least one of: information on a required guard band, information on whether uplink transmission using only a subset of the granted resource is enabled, and a subset of the granted resource allowed to be used for uplink transmission from the user equipment.

In still another embodiment, the method may further comprise: transmitting to the user equipment, via a higher signaling, at least one of: information on a required guard band, information on whether uplink transmission using only a subset of the granted resource is enabled, and a subset of the granted resource allowed to be used for uplink transmission from the user equipment.

In an embodiment, the required guard band may be associated with transmission bandwidth for a transport block, and/or, specific to the user equipment.

In another embodiment, determining the subset of the granted resource occupied by uplink transmission may comprise: determining the subset by detecting at least one of: presence of a signal in a channel included in the granted resource, a transmission format of the signal, a sequence associated with the signal, a cyclic shift associated with the signal, and an information field carried by the signal. In a further embodiment, the signal may include at least one of: a demodulation reference signal, a preamble, and a control signaling.

In an embodiment, the network node may determine the subset of the granted resource by determining the subset based on information on a required guard band.

In another embodiment, detecting the uplink transmission from the user equipment in the determined subset of the granted resource may comprise: determining a transmission parameter for the uplink transmission based on the determined subset of the granted resource; and detecting the uplink transmission in the determined subset based on the determined transmission parameter. In a further embodiment, determining the uplink transmission parameter may comprise at least one of: determining a number of transport blocks for the uplink transmission of the user equipment; and determining a transport block size, TBS, for the uplink transmission of the user equipment.

In some embodiments, determining the TBS may comprise: determining the TBS based on a bandwidth of the determined subset, or a ratio between the bandwidth of the determined subset and a total bandwidth of the granted resource. In an embodiment, determining the TBS based on the bandwidth of the determined subset of the granted resource for uplink transmission may comprise: selecting a TBS associated with the bandwidth of the determined subset from a predefined mapping table, or obtaining the TBS based on a predefined function of the bandwidth of the determined subset. In another embodiment, determining the TBS based on the ratio may comprise: obtaining an initial TBS associated with the granted resource from the uplink grant; and determining the TBS for the uplink transmission by multiplying the initial TBS with the ratio.

In a third aspect of the disclosure, there is provided a user equipment. The user equipment comprises a processing circuitry and a memory and said memory contains instructions executable by said processing circuitry whereby said user equipment is operative to: receive an uplink grant from a network node, the uplink grant indicating a granted resource associated with a plurality of channels; detect availability of the plurality of channels; determine an uplink transmission parameter based on the uplink grant and a result from the detection; and transmit data to the network node according to the determined uplink transmission parameter.

In a fourth aspect of the disclosure, there is provided a network node. The network node comprises a processing circuitry and a memory, and said memory contains instructions executable by said processing circuitry whereby said network node is operative to: transmit an uplink grant to a user equipment, the uplink grant indicating a granted resource; and determine a subset of the granted resource occupied by uplink transmission from the user equipment; and detect the uplink transmission from the user equipment in the determined subset of the granted resource.

In a fifth aspect of the disclosure, there is provided a user equipment, and the user equipment is configured to: receive an uplink grant from a network node, the uplink grant indicating a granted resource associated with a plurality of channels; detect availability of the plurality of channels; determine an uplink transmission parameter based on the uplink grant and a result from the detection; and transmit data to the network node according to the determined uplink transmission parameter.

In a sixth aspect of the disclosure, there is provided a network node, and the network node is configured to: transmit an uplink grant to a user equipment, the uplink grant indicating a granted resource; and determine a subset of the granted resource occupied by uplink transmission from the user equipment; and detect the uplink transmission from the user equipment in the determined subset of the granted resource.

In a seventh aspect of the disclosure, there is provided a computer program. The computer program comprises instructions which, when executed by at least one processing circuitry of a user equipment, causes the user equipment to carry out a method of the first aspect of the present disclosure.

In an eighth aspect of the disclosure, there is provided a computer program. The computer program comprises instructions which, when executed by at least one processing circuitry of a network node, causes the network node to carry out the method of the second aspect of the present disclosure.

In a ninth aspect of the disclosure, there is provided a carrier containing the computer program of the seventh or eighth aspect of the present disclosure, wherein the carrier is one of an electronic signal, optical signal, radio signal, or computer readable storage medium.

According to various aspects and embodiments as mentioned above, efficient uplink data transmission may be enabled.

BRIEF DESCRIPTION OF THE DRAWINGS

The above and other aspects, features, and benefits of various embodiments of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network nodes in the wireless communication network may be performed according to any suitable generation communication protocol, including, but not limited to, Global System for Mobile Communications (GSM), Universal Mobile Telecommunications System (UMTS), Long Term Evolution (LTE), and/or other suitable communication protocols, such as the first generation (1G), the second generation (2G), 2.5G, 2.75G, the third generation (3G), the fourth generation (4G), 4.5G, the fifth generation (5G) communication protocols, wireless local area network (WLAN) standards, such as the IEEE 802.11 standards; and/or any other appropriate wireless communication standard, and/or any other protocols either currently known or to be developed in the future.

As used herein, the term "network node" refers to a device in a wireless communication network via which a terminal device accesses the network and receives services therefrom. The network node may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink (DL) transmission refers to a transmission from a network node to a user equipment, and an uplink (UL) transmission refers to a transmission in an opposite direction.

Figure 1:
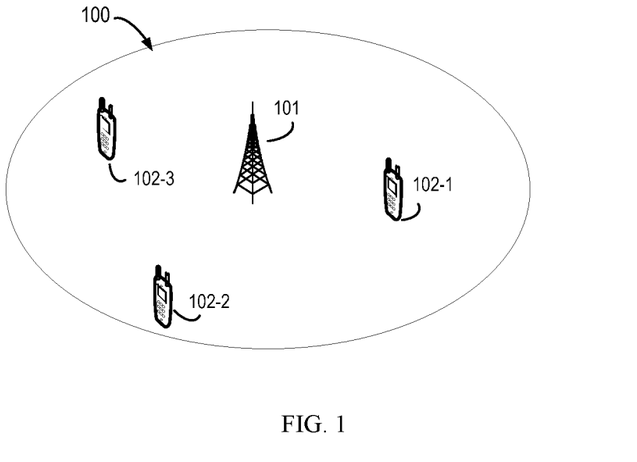
FIG. 1 illustrates an example wireless communication network in which embodiments of the present disclosure may be implemented.

FIG. 1 illustrates an example wireless communication network 100 in which embodiments of the present disclosure may be implemented. As shown in FIG. 1, the wireless communication network 100 may include one or more network nodes, for example, a network node 101, which may be in a form of an eNB or gNB. It will be appreciated that the network node 101 may also be in a form of base station (BS), a Node B (NB), a virtual BS, Base Transceiver Station (BTS), and/or Base Station Subsystem (BSS), AP and the like. The network node 101 provides radio connectivity to a set of UEs 102-1, 102-2, . . . , 102-N, which are collectively referred to as "UE(s) 102", within its coverage, where N is a natural number.

In some embodiments, the wireless communication network 100 may be, but not limited to, a NR system. Some potential features of a NR system are described below.

A NR system may be expected to support a plurality of numerologies each of which is defined by a sub-carrier spacing and a cyclic prefix (CP) overhead. A plurality of subcarrier spacing configurations corresponding to the plurality of numerologies may be derived by scaling a basic subcarrier spacing by an integer of $2^n$, where n is a non-negative integer. Selection of a numerology to be used may be independent of an operating frequency band, although it is assumed not to use a very small subcarrier spacing at very high carrier frequencies.

In general, a flexible channel bandwidth for network and UE is to be supported in a NR system. From 3GPP Radio Access Network 1 (RAN1) specification perspective, the maximum channel bandwidth per NR carrier may be 400 MHz in Release 15 (Rel-15). Note that details for the supported maximum channel bandwidth up to at least 100 MHz per NR carrier are to be specified in Rel-15. At least for a scenario where a wireless communication network only supports a single numerology, candidates for the maximum number of subcarriers per NR carrier may be 3300 or 6600 in Rel-15 from 3GPP RAN1 specification perspective. Furthermore, potential extension of these parameters in future releases may be taken into consideration in NR channel designs, so as to allow Rel-15 UE to access the NR network on same frequency band in later release.

Furthermore, in a NR system, time duration for a subframe may be fixed to be 1 ms and a frame length may be 10 ms. Though scalable numerologies may be allowed to support a subcarrier spacing that may range at least from 15 kHz to 480 kHz, all of the numerologies (with 15 kHz or larger subcarrier spacing) align on symbol boundaries every 1 ms in a NR carrier regardless of CP overhead. More specifically, for a normal CP family, the following configuration in Table I may be adopted.

TABLE I

Configurations on subcarrier spacing and symbol length

For subcarrier spacing of 15 kHz * $2^n$ (n is non-negative integer),
Each symbol length (including CP) of 15 kHz subcarrier spacing equals the sum of the corresponding $2^n$ symbols of the scaled subcarrier spacing.
Other than the first OFDM symbol in every 0.5 ms, all OFDM symbols within 0.5 ms have the same size.
The first OFDM symbol in 0.5 ms is longer by $16T_s$ (assuming 15 kHz and FFT size of 2048) compared to other OFDM symbols.
$16 T_s$ is used for CP for the first symbol.
For subcarrier spacing of 15 kHz * $2^n$ (n is a negative integer)
Each symbol length (including CP) of the subcarrier spacing equals the sum of the corresponding $2^n$ symbols of 15 kHz.

Alternatively or in addition, the wireless communication network 100 may support operating in an unlicensed band, for example in a Licensed-Assisted Access (LAA) mode or a evolved LAA (eLAA) mode, in which one or more unlicensed carriers serve as secondary cells (Scells) while a licensed carrier serves as a primary cell (Pcell). A baseline for LAA UL multicarrier operation is an extension of a single carrier operation when an eNB schedules physical uplink shared channel (PUSCH) transmissions on multiple carriers.

An unlicensed carrier may be shared by a plurality of communication networks, and therefore in order to avoid interference to/from other devices, availability of an unlicensed carrier should be determined before transmission is conducted on the unlicensed carrier. Availability of the unlicensed carrier may be determined via, for example but not limited to, a Listen Before Talk (LBT) mechanism. A category or type of the LBT for a carrier may be signaled to UE, for example, via a corresponding UL grant. Each category or type of LBT has an associated time length for performing the LBT operation.

In an embodiment, a UE that has received UL grants for a set of carriers scheduled with same starting points in subframe on all carriers and has been configured category (Cat.) 4 LBT with a long-time duration (e.g., 100 us) for listening may switch to short LBT (e.g., 25 us) immediately, if the Cat. 4 LBT has completed successfully on a designated carrier of the set of carriers. Note that in this example embodiment, the designated carrier has to be selected by the UE uniformly and randomly from the set of carriers scheduled with the Cat. 4 LBT, prior to starting the Cat. 4 LBT procedure on any of the carriers in the set.

Figure 2:
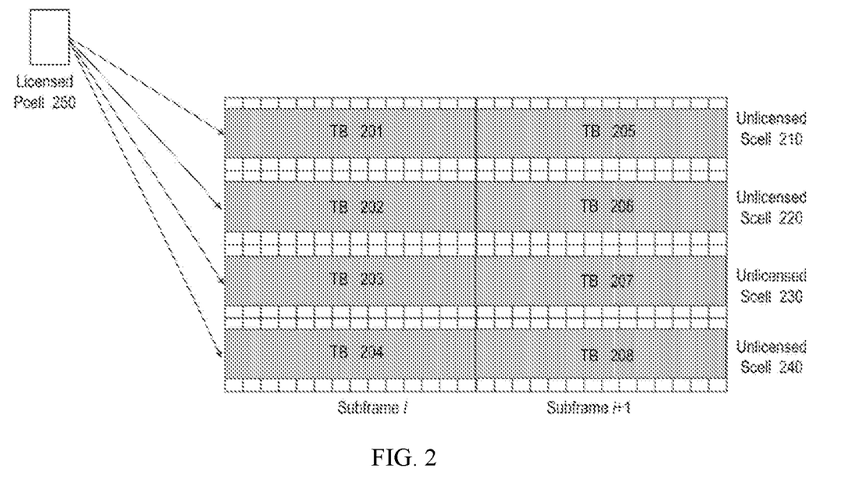
FIG. 2 illustrates an example for multi-channel UL transmission according to an embodiment of the present disclosure.

FIG. 2 illustrates an example for multi-channel UL transmission in eLAA mode in which UL grants for 4 unlicensed Scells 210-240 are transmitted via a licensed Pcell 250 to a user equipment. As shown in FIG. 2, transportation blocks (TB) 201-208 are generated for each carrier and subframe separately when LBT succeeds in the carriers 210-240 according to any of the abovementioned mechanisms/rules. Due to LTE bandwidth limitation (i.e. the maximum bandwidth supported in LTE is 20 MHz), there may be a guard band for each carrier 210-240.

Figure 3:
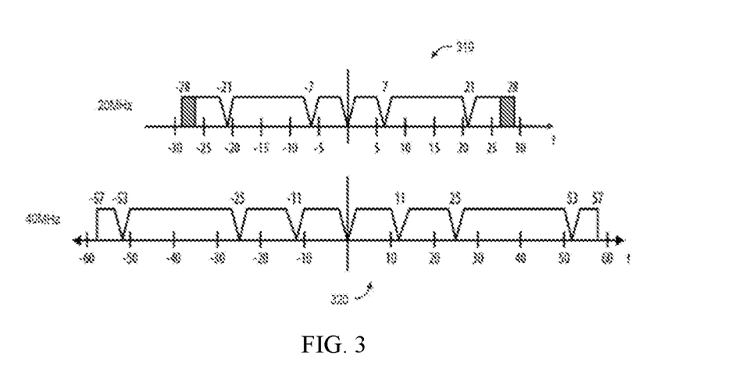
FIG. 3 shows an example for channels with a 20 MHZ bandwidth and a 40 MHZ bandwidth respectively.

A Wireless Fidelity (WiFi) system may also operate in the unlicensed band. Unlike eLAA, WiFi (e.g., 802.11n, 802.11ac, etc.) defines new channels wider than 20 MHz. For instance, the channel may have a bandwidth of 40 MHz. FIG. 3 shows an example for channels with 20 MHz bandwidth and 40 MHz bandwidth respectively. As shown in FIG. 3, a 20 MHz channel 310 includes 56 subcarriers in total and among which 52 subcarriers are usable and 4 subcarriers are reserved for a guard band, while the 40 MHz channel 320 includes 114 subcarriers in total and among which 108 subcarriers are usable. That is, the 40 MHz channel 320 provides more usable subcarriers than simple aggregation of two 20 MHz channels 310. The benefit comes from decrease of guard band and reduction of pilot subcarrier overhead. In other words, a wider channel may bring higher spectrum efficiency.

Before transmitting a frame with a 40 MHz bandwidth, UE needs to ensure that the entire 40 MHz channel is clear. A mechanism based on carrier sensing or energy detection may be performed for detecting availability of the channel. For example, Clear-channel assessment (CCA) may be performed on a primary channel according to any well-known rule for transmission on a WiFi (e.g., 802.11) channel. Even if UE intends to transmit a 40 MHz frame, slot boundaries and timing are still based on its access to the primary channel only. A secondary channel has to be detected as idle during a priority interframe space which is a time duration used for LBT, before it can be used as part of the 40 MHz transmission. In WiFi, UE decides by itself, based on LBT results, as to when and how to transmit UL data (i.e. perform 20 MHz or 40 MHz transmission).

A NR system may support a maximum carrier bandwidth of at least 100 MHz according to current 3GPP agreement. It is expected that a NR system operating in an unlicensed band (also referred to as NR-U) may support new carrier bandwidths wider than 20 MHz to increase spectrum efficiency. However, unlike UE in WiFi that determines transmission format itself, NR-U UE needs to follow an UL grant from gNB side. Namely, NR-U UE transmits UL data according to a resource allocation and a Modulation and Coding Scheme (MCS) assigned by the gNB and included in the UL grant.

One example of the resource allocation in NR can be found in FIG. 2. In this example, a whole bandwidth of 80 MHz which covers four 20 MHz channels 210-240 in unlicensed band is granted to one UE via a UL grant from a licensed Pcell 250. However, it has been realized by inventors of the present disclosure that UE may need to detect availability of each 20 MHz channel (e.g., via LBT) respectively and the LBT may fail for some of the channels due to other co-existing systems, such as LAA/eLAA-LTE and WiFi, in the unlicensed band.

If LBT fails for one or more of the channels, the UE couldn't transmit data in the whole 80 MHz band according to original UL grant, otherwise, interference will occur. On the other hand, if UE gives up UL transmission on all the channels in this case, channel utilization efficiency will be rather low, since LBT failure in some of the channels may occur frequently. Therefore, it is proposed by inventors of the present disclosure that it may be beneficial to allow a UE to transmit data in partial bandwidth of the granted resource.

Currently, it is still open as to how to enable UL data transmission from the UE if part of the scheduled bandwidth is unavailable, and this problem has not even been considered in conventional licensed-band based systems, Wi-Fi or eLAA-LTE.

In embodiments of the present disclosure, methods, apparatuses and computer program products have been proposed to enable adaptive UL transmission and improve UL transmission efficiency. Some of the embodiments may be applied to solve at least part of the above problems. However, it should be appreciated that embodiments are not limited to being applied in a NR system or an eLAA system, but could be applied more widely to any wireless communication network where similar problems exist.

Figure 4:
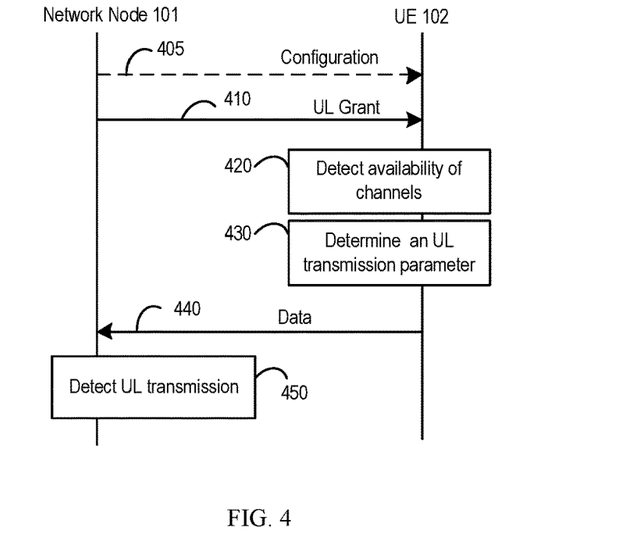
FIG. 4 shows schematically an example process for adaptive UL data transmission according to an embodiment of the present disclosure.

FIG. 4 shows schematically an example procedure for adaptive UL data transmission according to an embodiment of the present disclosure. In this example, UE 102 receives (410) an UL grant from the network node 101, and the UL grant indicates a granted resource including a plurality of channels. Optionally, UE 102 may receive (405) additional configuration information on its UL transmission, and the additional configuration information may include information on a required guard band, information on whether adaptive uplink transmission using only a subset of the granted resource is enabled, and a subset of the granted resource allowed to be used for uplink transmission from UE 102. UE 102 detects (420) availability of the plurality of channels and determines (430) channels to be used for UL transmission, and determines (430) an uplink transmission parameter based on the uplink grant and a result from the detection, and optionally the additional configuration information. Then UL data (and optionally other signal) is transmitted (440) according to the determined uplink transmission parameter from UE 102 and detected (450) by the network node 101.

Reference is now made to FIG. 5 which shows a flowchart of a method 500 in a user equipment, for example one of the UE 102. For ease of discussion, the method 500 will be described below with reference to UE 102 and the communication network 100 illustrated in FIG. 1. However, embodiments of the present disclosure are not limited thereto.

As shown in FIG. 5, at block 510, the UE 102 receives an uplink grant from the network node 101. The uplink grant indicates a granted resource associated with a plurality of channels. In an embodiment, the granted resource may be in an unlicensed band, for example but not limited to, an Industrial Scientific Medical (ISM) band. For instance, the granted resource may include an 80 MHz bandwidth covering four 20 MHz channels as shown in FIG. 2. In a further embodiment, at block 510, the UE may receive the uplink grant via a licensed carrier from the network node.

Figure 6A:
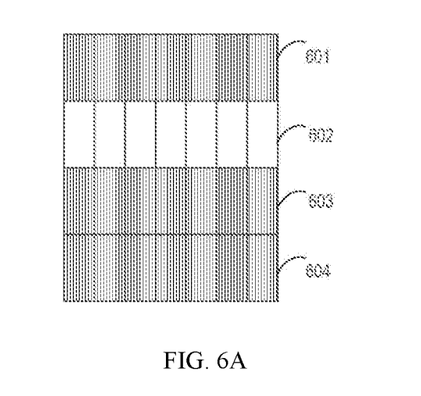
FIG. 6A illustrates an example for a result of channel availability detection.

At block 520, the UE 102 detects availability of the plurality of channels. Embodiments are not limited to any specific way for the detecting. As an example rather than limitation, at block 520, the UE 102 may detect availability of the plurality of channels by performing a mechanism based on carrier sensing or energy detection for each of the plurality of channels. The mechanism may be, for example but not limited to, a LBT mechanism, a Carrier-Sensing Adaptive Transmission (CSAT) mechanism, and the like. FIG. 6A illustrates an example for a result of the detection, assuming that UE 102 is granted, via the uplink grant received at block 510, a wide bandwidth spanning 4 channels 601-604 in a 5 GHz band, with 20 MHz bandwidth for each channel. In this example, channels 601, 603, 604 in the granted resource are detected as idle/available while channel 602 is detected as busy/unavailable.

At block 530, the UE 102 determines an uplink transmission parameter based on the uplink grant and a result from the channel availability detection. The determination at block 530 enables UE 102 to adjust its uplink transmission parameter(s) adaptively based on the uplink grant and the detection. The uplink transmission parameter determined at block 530 may include, but not limited to, one or more of: a subset of the granted resource for uplink transmission of UE 102, a number of transport blocks (TBs) for the uplink transmission, and a transport block size (TB S) for the uplink transmission. Alternatively, or in addition, in an embodiment, UE 102 may determine MCS for the uplink transmission.

Figure 6B:
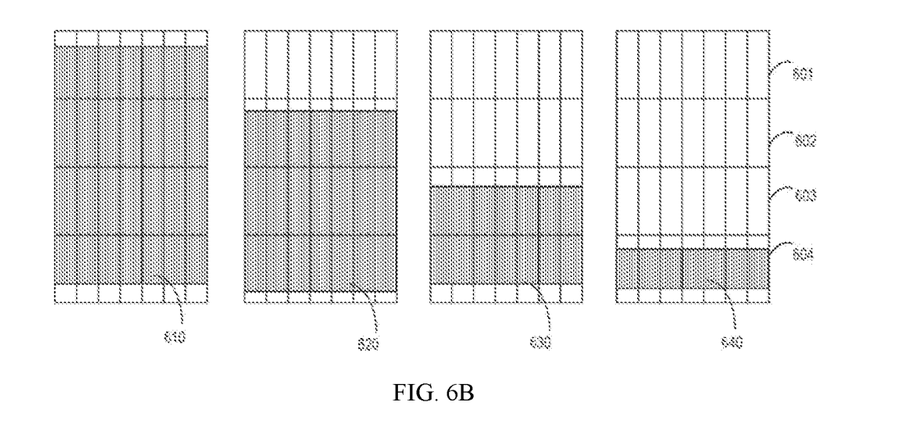
FIG. 6B illustrates examples of uplink resource determined for uplink transmission according to an embodiment of the present disclosure.

Depending on the detection result, the uplink transmission parameter determined at block 530 may be same as or different from that indicated in the uplink grant. FIG. 6B illustrates some examples of uplink resource determined for uplink transmission by UE 102 at block 530, assuming that the granted resource includes channels 601-604 as shown in FIG. 6A. As shown in FIG. 6B, depending on results of the detection, the determined resource may be resource 610 with a 80 MHz bandwidth, resource 620 with a 60 MHz bandwidth, resource 630 with a 40 MHz bandwidth, or resource 640 with a 20 MHz bandwidth. It should be appreciated that resource determined by UE 102 at block 530 may have a pattern/format different from that shown in FIG. 6B. In an embodiment, the determined resource may be discontinuous in frequency and may cover, for example, channels 601 and 603, or channels 601, 602 and 604.

In some embodiment, at block 530, UE 102 may determine the transmission parameter further based on additional information. For example, UE 102 may need to consider subset(s) of the granted resource allowed to be used for the uplink transmission from the UE 102. In some embodiments, at block 530, UE 102 may determine a subset of the granted resource for uplink transmission by selecting the subset from a plurality of predefined subsets of the granted resource. The plurality of predefined subsets may be used to reduce blind detection complexity at the receiver side. For instance, the granted resource indicated in the uplink grant may include four channels 601-604 shown in FIG. 6A, and the predefined subsets of the granted resource allowed to be used for uplink transmission may include subset 0={channels 601-604}, subset 1={channels 601-603}, subset 2={channels 601-602}, subset 3={channels 602-604}, and subset 4={channels 603-604}. In this example, UE 102 is not allowed to transmit on a single channel or discontinuous channels, but can only select a subset from the predefined subset 0 to subset 4 based on its detection on channel availability. Each subset of resource is also referred to as a resource pattern hereafter.

Alternatively, or in addition, in some embodiments, UE 102 may determine the transmission parameter further based on information on a required guard band, and/or, information on whether uplink transmission using only a subset of the granted resource is enabled. Some examples are provided below for illustration purpose.

For instance, if uplink transmission using only a subset of the granted resource is not enabled, the UE 102 may determine to suspend its uplink transmission upon detecting that one or more of the plurality of channels are busy/unavailable.

In some embodiments, UE 102 may determine a starting physical resource block (PRB) and an ending PRB for an available channel or a set of continuous available channels for uplink transmission based on information on a required guard band. The guard band is used to meet regulation requirement in unlicensed band, i.e., requirement on adjacent channel emission. The required guard band may, but not necessarily, depend on bandwidth for a transport block. Table II shows some examples of the required guard band and corresponding transmission bandwidths. For example, for a 20 MHz transmission bandwidth, the first and last 5 PRBs will serve for the guard band, and for a 80 MHz transmission bandwidth, 28 PRBs will be required.

TABLE II

| BW | 20 MHZ | 40 MHz | 60 MHz | 80 MHz |
|---|---|---|---|---|
| No. Total PRB | 110 | 220 | 330 | 440 |
| No. Guard PRB | 10 = 5*2 | 16 = 8*2 | 22 = 11*2 | 28 = 14*2 |

Figure 7A:
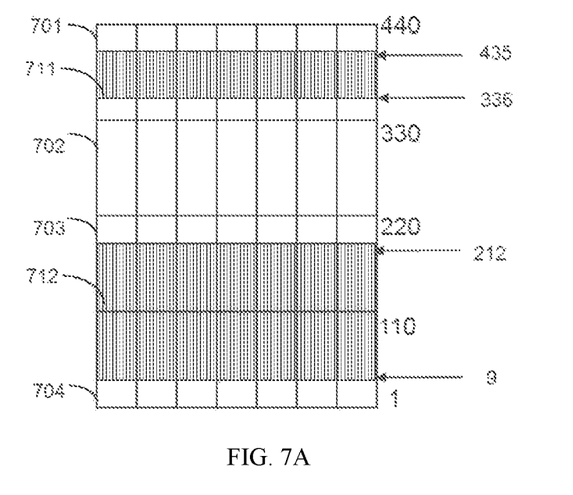
FIGS. 7A-7B show examples for determining the starting and ending PRBs for UL data transmission according to an embodiment of the present disclosure.
Figure 7B:
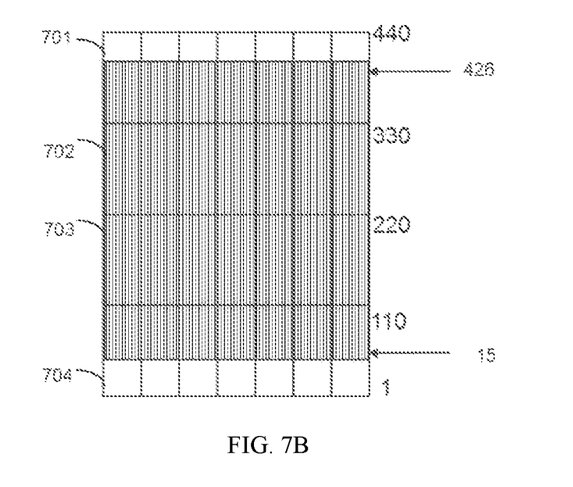

FIGS. 7A-7B show examples for determining the starting and ending PRBs according to the guard band configuration shown in Table II. In the example shown in FIG. 7A, a resource with a 80 MHz bandwidth, including PRBs 1 to 440, is granted to the UE 102 via an uplink grant, but UE 102 detects (for example via LBT) that the second channel 702 included in the granted resource is unavailable and determines that channels 701, 703 and 704 can be used for uplink transmission. Further, UE 102 may determine number of TBs required for the uplink transmission based on the detection. In this example, UE 102 may determine to transmit one TB 711 in channel 701 and another TB 712 in the adjacent channels 703 and 704. By aggregating the continuous channels 703 and 704, guard band required can be reduced. For the channel 701 with a 20 MHz TB bandwidth, two guard bands of 5 PRBs may be reserved according to the configuration shown in Table II, and as a results the starting PRB is determined to be PRB 336 and the ending PRB is determined to be PRB 435. Likewise, for continuous channels 703 and 704 covering a 40 MHz TB bandwidth, two guard bands of 8 PRBs may be reserved, and the starting and ending PRBs are determined to be PRB 9 and PRB 212. In the example shown in FIG. 7B, all of the four granted channels 701-704 are detected as available, and UE determines to transmit only one TB in the 4 continuous channels. For the TB bandwidth of 80 MHz, two guard bands of 14 PRBs should be reserved according to Table II, and as a result, the starting and ending PRBs are determined to be PRB 15 and PRB 426 respectively.

In some embodiments, UE 102 may further determine a TBS for uplink transmission, based on the uplink grant and the detection (and optionally the additional information). Some examples for determining the TBS are provided below for illustration rather than limitation.

For instance, at block 530, UE 102 may determine the TBS based on a bandwidth of a determined subset of the granted resource for uplink transmission. In particular, in an embodiment, UE 102 may select a TBS associated with the bandwidth of the determined subset from a predefined mapping table. That is, a mapping between the bandwidth and the TBS is predefined and UE 102 may determine the TBS based on the mapping and the determined bandwidth. Alternatively, the TBS may be predefined as a function of the bandwidth, and UE 102 may obtain the TBS based on the predefined function.

Figure 5A:
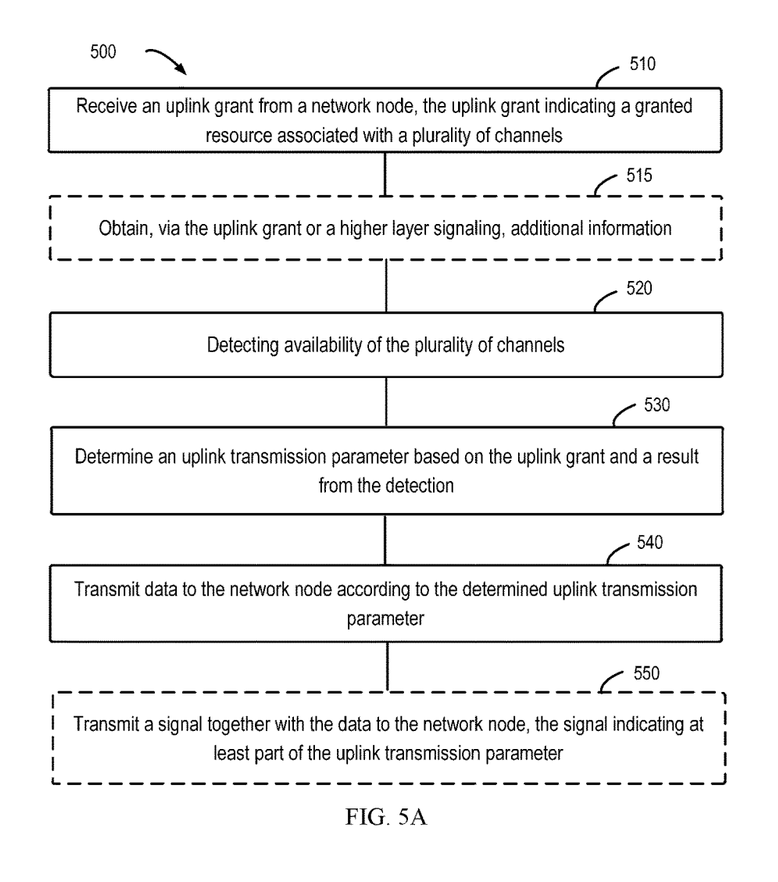
FIGS. 5A-5B illustrate flow charts of a method in a user equipment according to an embodiment of the present disclosure.
Figure 5B:
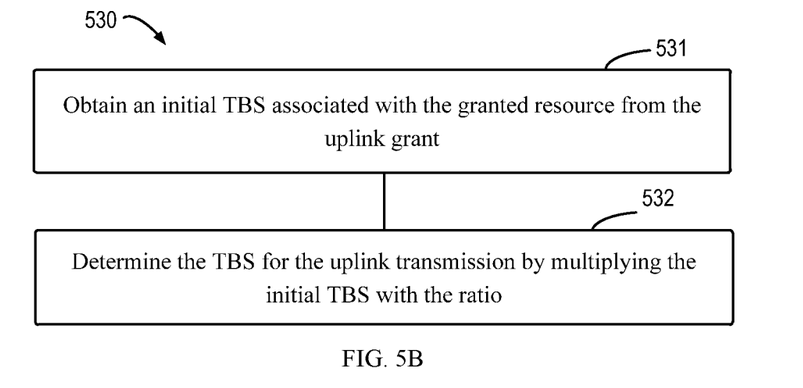

Alternatively, or in addition, UE 102 may determine the TBS based on a ratio between the bandwidth of the determined subset and a total bandwidth of the granted resource. One example implementation of block 530 is shown in FIG. 5B. In this example, at block 531, UE 102 obtains an initial TBS associated with the granted resource from the uplink grant, for example based on a mapping table; and at block 532, UE 102 determines the TBS for the uplink transmission by multiplying the initial TBS with the ratio.

Assuming same detection result as that shown in FIG. 7A, UE 102 may perform TBS calculation according to one of the following methods known by both UE 102 and the network node 101:

Method 1: For each TB, UE 102 calculates the TBS based on the determined starting PRB and ending PRB, for example, according to any legacy method used for NR licensed band. For example, UE 102 may obtain the TBS by checking a mapping table, using a MCS index indicated in the uplink grant and the number of available PRBs for the TB determined from the detection as inputs. For example, for TB 712 shown in FIG. 7A, the number of available PRBs is determined to be 212−9+1=204, and the TBS for the TB 712 may be obtained by selecting a TBS corresponding to the bandwidth of 204 PRBs from a TBS mapping table.

Method 2: UE 102 calculates the TBS for the granted resource, for example according to any legacy method used for NR licensed band. For example, UE 102 may select a TBS corresponding to the bandwidth of the whole granted resource from a predefined mapping table. Then a scaled value (or a ratio) is calculated for each TB. For instance, the scalable value for the i-th TB may be determined as: Alpha_i=(number of PRBs in the i-th TB)/(number of PRBs for the granted resource). With this method, the scaled value (or ratio) for TB 712 shown in FIG. 7A may be determined as: (212−9+1)/(426−15+1)=0.495. Then the TBS for the i-th TB is determined to be Alpha_i*TBS for granted resource. That is, TBS for a TB can be determined by weighting the initial TBS for the granted resource with a ratio. In this way, the prepared code blocks (CBs) for the granted TB indicated in the uplink grant could be reused for new TB(s) determined by the UE 102 based on the detection.

In an embodiment, at least part of the additional information used for determining the uplink transmission parameter may be obtained by UE 102 via explicit signaling from the network node 101. For example, as shown in FIG. 5A, at an optional block 515 of method 500, UE 102 may obtain, via the uplink grant or a higher layer signaling, at least one of: the information on a required guard band, the information on whether uplink transmission using only a subset of the granted resource is enabled, and the subset(s) of the granted resource allowed to be used for uplink transmission from the user equipment. In an embodiment, some of the additional information may be common to a plurality of UEs, and in this case, the UE 102 may receive the common additional information via a broadcast signaling. In another embodiment, some of the addition information (e.g., required guard band, or enabling of uplink transmission in part of the granted resource) may be UE specific, and in this case, UE 102 may receive the UE-specific additional information via a dedicated signaling. It should be appreciated that in some other embodiments, the information on the required guard band and/or the subset of the granted resource allowed to be used for uplink transmission may be predefined, and in this case, corresponding signaling may be avoided. For example, the information on the required guard band may be hardcoded and known to UE 102 without signaling.

As shown in FIG. 5A, at block 540, UE 102 transmits data to the network node 101 according to the determined uplink transmission parameter. In an embodiment, the uplink transmission parameters of UE 102 may be obtained at the receiver (i.e., the network node 101) side based on blind detection. Alternatively, in another embodiment, at least part of the uplink transmission parameter may be indicated to the network node 101 in an implicit or explicit manner.

Figure 8:
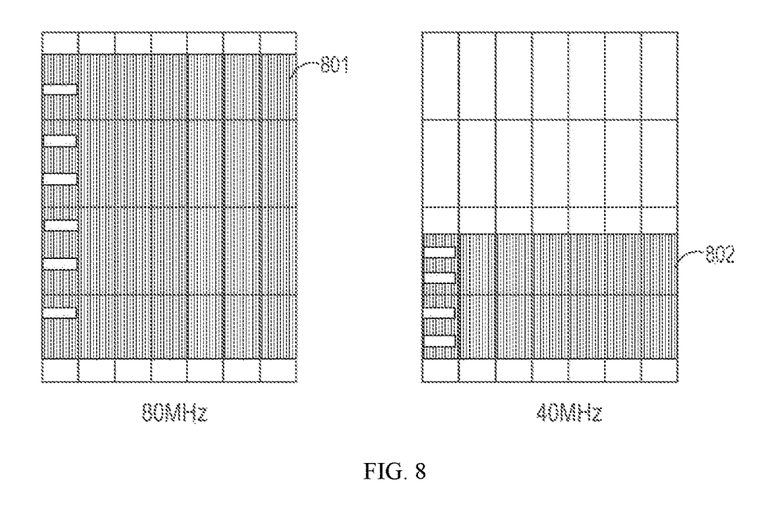
FIG. 8 illustrates an example of DMRS design according to an embodiment of the present disclosure.

For example, optionally, at block 550, UE 102 may transmit a signal to the network node, and the signal indicates at least part of the uplink transmission parameter. In some embodiments, the signal may indicate at least part of the uplink transmission parameter via one or more of: a transmission format of the signal, a sequence associated with the signal, a cyclic shift associated with the signal, and an information field included in the signal. For illustration rather than limitation, some examples for indicating the UL transmission parameters are provided below In an embodiment, UE 102 may transmit a demodulation reference signal (DMRS), a preamble, and/or a control signaling (e.g., together with the data) to the network node, so as to facilitating detection of the data transmission. In an embodiment, the resource positions/distribution of the DMRS may depend on the resource pattern utilized for the uplink data transmission of the UE 102. One example of the DMRS design is shown in FIG. 8. As shown in FIG. 8, DMRS distribution for the resource pattern 801 covering a 80 MHz bandwidth is sparser than that for the resource pattern 802 covering a 40 MHz bandwidth. Therefore, it enables the network node 101 to determine resource pattern utilized for data transmission based on DMRS detection.

Alternatively, or in addition, in another embodiment, a sequence or cyclic shift for the DMRS transmitted by UE 102 at block 550 may depend on the resource pattern utilized for the uplink transmission, thereby indicating the resource pattern to the network node 101 implicitly. The benefit of these example embodiments is that channels used for the data transmission by UE 102 may be indicated to the network node implicitly, i.e., no addition indicator or signal is needed.

Optionally, in another embodiment, a new indication may be transmitted by the UE 102 at block 550, for example in first one or more symbols in a subframe, to indicate to the network node 101 the channels occupied for data transmission. For example, an explicit preamble may be transmitted by UE 102 in each available channel with a 20 MHz bandwidth. Then the network node 101 may detect the preamble in each channel and determine whether the channel is occupied by UE 102 for data transmission based on presence of the preamble. For instance, if a preamble is detected in the first OFDM symbol in a channel, the network node 101 will determine that there is data transmission in following OFDM symbols in the channel. It should be appreciated that, however, the indication or preamble may be transmitted by the UE 102 in any symbol in a subframe. Furthermore, embodiments of the present disclosure are not limited to indicating any specific UL transmission parameter, for example via the DMRS, preamble and/or indication, to the network node 101.

Embodiments of method 500 enable adaptive transmission from the UE 102 in the granted resource, and may increase transmission opportunity of UE 102 and improve transmission reliability.

Figure 9A:
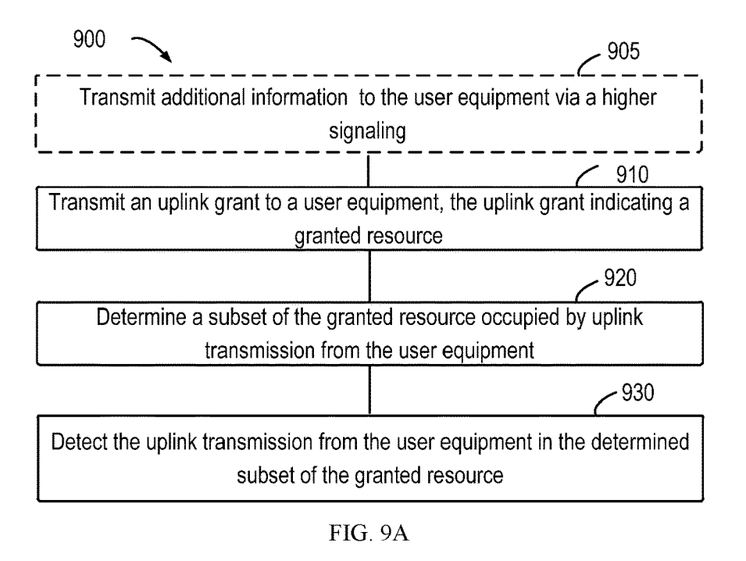
FIG. 9A-9C illustrates flow charts of a method in a network node according to an embodiment of the present disclosure.

Reference is now made to FIG. 9 which shows a flowchart for an example method 900 implemented in the network node 101. Though for ease of discussion, method 900 will be described below with reference to the network node 101 and the communication network 100 illustrated in FIG. 1, it should be appreciated that embodiments of the present disclosure are not limited thereto.

As shown in FIG. 9, at block 910, network node 101 transmits an uplink grant to the UE 102. The uplink grant indicates a granted resource for the UE 102. However, as described with reference to method 500, UE 102 may transmit on the whole bandwidth of the granted resource or a part of the granted resource, depending on availability of channels included in the granted resource.

In an embodiment, the uplink grant may further comprise additional information which may include (but not limited to) at least one of: information on a required guard band, information on whether uplink transmission using only a subset of the granted resource is enabled, and a subset of the granted resource allowed to be used for uplink transmission from the user equipment.

The additional information may be used by the UE 102 to determine a proper uplink transmission parameter, as described with reference to method 500. For example, the additional information may indicate enabling or disabling of the adaptive UL transmission for certain UEs. In some embodiments, a low-cost UE may not implement such adaptive UL transmission function and the function may be disabled by the network node 101.

The subset of the granted resource allowed to be used for uplink transmission may be configured/predefined in order to alleviate the receiving processing complexity at network node 101 side. For example, it may be configured that only resource 630 with a 40 MHz bandwidth and resource 610 with a 80 MHz bandwidth in FIG. 6B may be allowed for uplink transmission if the UL grant indicated a 80 MHz bandwidth. In this way, only the resource format of 40 MHz and 80 MHz is needed to be used for blind detection.

In some embodiments, the required guard band may be associated with a transmission bandwidth for a transport block. As shown in Table II. In another embodiment, the required guard band may be UE specific, or UE capability specific. For example, high cost UEs with a powerful filter may be configured with a narrower guard band to increase the spectrum efficiency.

In some embodiments, at least part of the additional information may be predefined, and in this case, the predefined information may be omitted from the uplink grant. Alternatively, in another embodiment, network node 101 may transmit at least part of the additional information to UE 102 via a higher layer signaling, for example at block 905. The higher layer signaling may include: a radio resource control (RRC) signaling, or a media access control (MAC) control element (CE).

At block 920, network node 101 determines a subset of the granted resource occupied by uplink transmission from UE 102. In some embodiments, the network node 101 may determine the subset of the granted resource by detecting at least one of: presence of a signal in a channel included in the granted resource, a transmission format (e.g., resource distribution) of the signal, a sequence associated with the signal, a cyclic shift associated with the signal, and an information field carried by the signal. As an example rather than limitation, the signal used for the determining at block 920 may include, but is not limited to, at least one of: a DMRS, a preamble, and a control signaling.

For instance, a DMRS detected in a first one or more symbols of a subframe may be used by the network node 101 to determine which resource pattern is used for the uplink data transmission, i.e., which channels of the granted resource are occupied by the uplink data transmission. In an example embodiment, DMRS positions/distribution may depend on the resource pattern utilized for the uplink transmission, as shown in FIG. 8. The network node 101 may tentatively perform correlation for all candidate positions of DMRS and determine if there is DMRS transmission in certain channel based on correlation results. If DMRS transmission is detected in a channel, the network node 101 may determine that the channel is used by the UE 102 for uplink data transmission. In a further embodiment, if DMRS transmission is detected in two adjacent channels, the network node 101 may determine that the two channels are used by the UE 102 for data transmission and there is no guard band between the two adjacent channels.

In another embodiment, a sequence or cyclic shift for the DM-RS may depend on the resource pattern utilized for the uplink transmission. By blinding detecting the DMRS sequence or cyclic shift, the network node 101 may determine resource used for the uplink transmission.

In some embodiments, at block 920, the network node 101 may detect an indication or preamble in each channel, and determine whether the channel is occupied by UE 102 for data transmission based on presence of such preamble or indication. That is, if a preamble is detected in the first OFDM symbol in a channel, the network node 101 will determine, at block 920, that there is data transmission in following OFDM symbols in the channel. It should be appreciated, however, that the indication or preamble may be detected by the network node 101 in any symbol in a subframe. In some embodiments, the detected DMRS, control signaling and/or preamble may indicate additional or different UL transmission parameters other than the subset of the granted resource for UL transmission.

In some embodiments, the network node 101 may determine the subset of resource used for UL transmission based on information on a required guard band. For instance, the network node may determine starting and ending PRB of a channel used for UL transmission based on the required guard band.

Figure 9B:
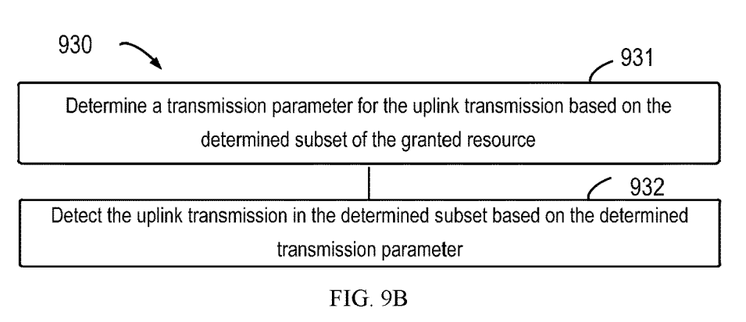

At block 930, network node 101 detects the uplink transmission from the UE102 in the determined subset of the granted resource. As shown in FIG. 9B which illustrates an implementation of block 930, the network node 101 may determine a transmission parameter for the uplink transmission based on the determined subset of the granted resource at block 931, and detect the uplink transmission in the determined subset based on the determined transmission parameter at block 932. The uplink transmission parameter determined at block 931 may include, but not limited to, a number of transport blocks for the uplink transmission of UE 102, and/or, a TBS for the uplink transmission of the UE 102.

In an embodiment, at block 931, the network node 101 may determine that only one TB is used for UL transmission if it detects that several continuous channels are occupied; otherwise two or more TBs will be determined.

Figure 9C:
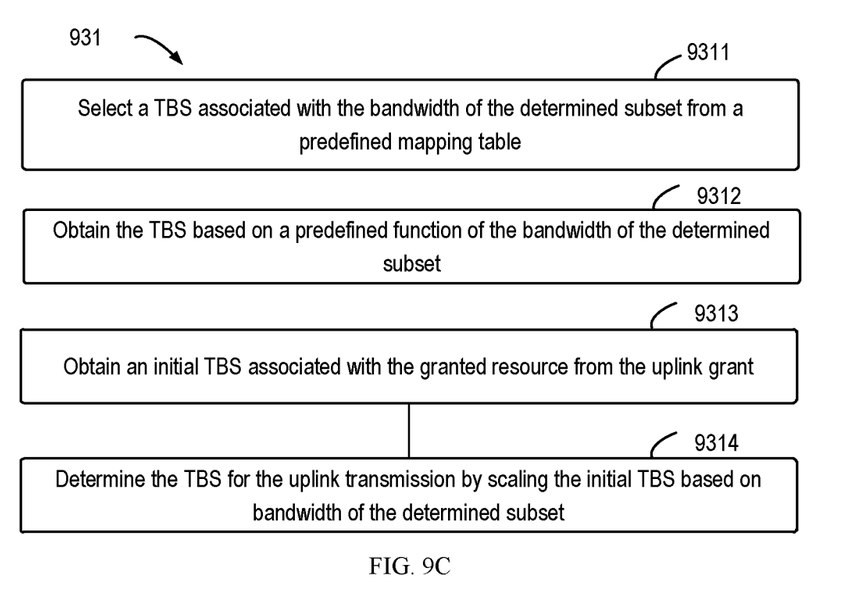

Alternatively, or in addition, the network node 101 may determine TBS for the UL transmission via one of the example implementations of block 931 shown in FIG. 9C. That is, the network node 101 may determine the TBS based on a bandwidth of the determined subset, or a ratio between the bandwidth of the determined subset and a total bandwidth of the granted resource.

In particular, the network node 101 may select a TBS associated with the bandwidth of the determined subset from a predefined mapping table as shown in block 9311, or obtain the TBS based on a predefined function of the bandwidth of the determined subset as shown in block 9312.

Alternatively, the network node 101 may firstly obtain an initial TBS associated with the granted resource from the uplink grant at block 9313, and then determine the TBS for the uplink transmission by scaling the initial TBS based on the bandwidth of the determined subset at block 9314. For example, the network node 101 may obtain the TBS for UL transmission by multiplying the initial TBS with the ratio between the bandwidth of the determined subset and a total bandwidth of the granted resource. In another embodiment, the network node 101 may obtain the TBS for UL transmission by multiplying the initial TBS with the ratio and another factor, for example, a constant weight.

An aspect of the present disclosure also provides a user equipment, for example the user equipment 102 shown in FIG. 1. The user equipment is operable to carry out method 500 described with reference to FIGS. 5A-5B and possibly any other processes or methods. The user equipment includes a receiving unit, a detecting unit, a determining unit and a transmitting unit. The receiving unit is configured to receive an uplink grant from a network node and the uplink grant indicates a granted resource associated with a plurality of channels. The detecting unit is configured to detect availability of the plurality of channel. The determining unit is configured to determine an uplink transmission parameter based on the uplink grant and a result from the detection, and the transmitting unit is configured to transmit data to the network node according to the determined uplink transmission parameter. In some embodiments, the receiving unit may be further configured to receive additional configuration information from the network node, and the additional configuration information may include at least one of: information on a required guard band, information on whether uplink transmission using only a subset of the granted resource is enabled, and a subset of the granted resource allowed to be used for uplink transmission from the user equipment. Alternatively, or in addition, in another embodiment, the transmitting unit may be further configured to transmit a signal to the network node and the signal indicates at least part of the uplink transmission parameter. Descriptions with respect to the signal, the UL grant, the detection and the determination provided with reference to method 500 also apply here and details will not be repeated.

Another aspect of the present disclosure provides a network node, for example the network node 101 shown in FIG. 1. The network node is operable to carry out method 900 described with reference to FIGS. 9A-9C and possibly any other processes or methods. The network node includes a transmitting unit, a determining unit and a detection unit. The transmitting unit is configured to transmit an uplink grant to a user equipment and the uplink grant indicates a granted resource. The determining unit is configured to determine a subset of the granted resource occupied by uplink transmission from the user equipment, and the detection unit is configured to detect the uplink transmission from the user equipment in the determined subset of the granted resource. In some embodiments, the transmitting unit is further configured to transmit additional configuration information to the user equipment. Descriptions with respect to the UL grant, the additional configuration information, the detection and the determination provided with reference to method 900 also apply here and details will not be repeated.

Figure 10:
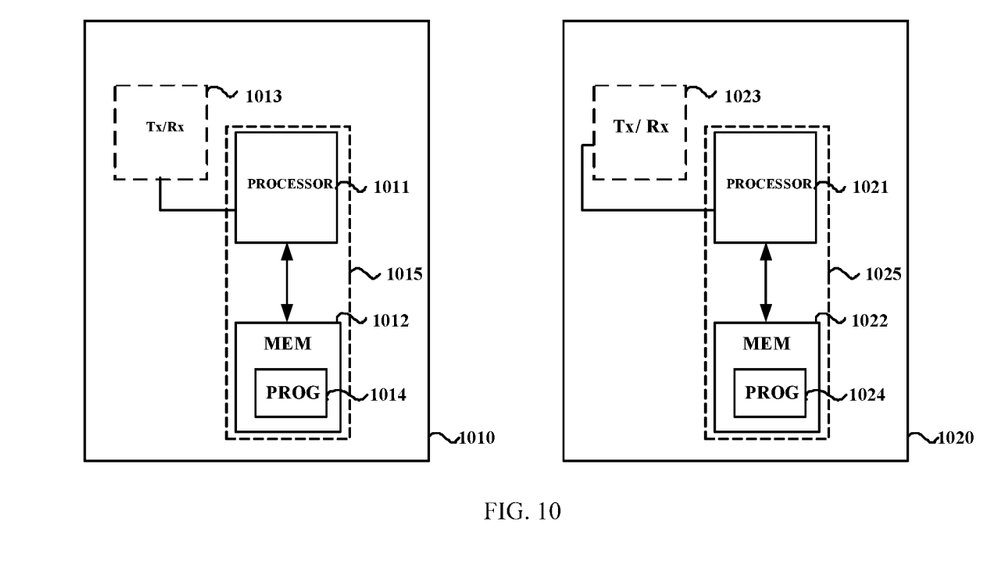
FIG. 10 illustrates a simplified block diagram of an apparatus that may be embodied as/in a user equipment and an apparatus that may be embodied as/in a network node.

FIG. 10 illustrates a simplified block diagram of an apparatus 1010 that may be embodied in/as a network node, for example, the network node 101 shown in FIG. 1, and an apparatus 1020 that may be embodied in/as a user equipment, for example, any of the user equipment 102 shown in FIG. 1.

The apparatus 1010 may include one or more processors 1011, such as a data processor (DP) and one or more memories (MEM) 1012 coupled to the processor 1011. The apparatus 1010 may further include a transmitter TX and receiver RX 1013 coupled to the processor 1011. The MEM 1012 may be non-transitory machine readable storage medium and it may store a program or a computer program product (PROG) 1014. The PROG 1014 may include instructions that, when executed on the associated processor 1011, enable the apparatus 1010 to operate in accordance with the embodiments of the present disclosure, for example to perform the method 900. A combination of the one or more processors 1011 and the one or more MEMs 1012 may form processing means 1015 adapted to implement various embodiments of the present disclosure.

The apparatus 1020 includes one or more processors 1021, such as a DP, and one or more MEMs 1022 coupled to the processor 1021. The apparatus 1020 may further include a suitable TX/RX 1023 coupled to the processor 1021. The MEM 1022 may be non-transitory machine readable storage medium and it may store a PROG 1024. The PROG 1024 may include instructions that, when executed on the associated processor 1021, enable the apparatus 1020 to operate in accordance with the embodiments of the present disclosure, for example to perform the method 500. A combination of the one or more processors 1021 and the one or more MEMs 1022 may form processing means 1025 adapted to implement various embodiments of the present disclosure.

Various embodiments of the present disclosure may be implemented by computer program or computer program product executable by one or more of the processors 1011 and 1021, software, firmware, hardware or in a combination thereof.

The MEMs 1012 and 1022 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 1011 and 1021 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a wireless communication system shown in FIG. 1 or unlicensed band, it should not be construed as limiting the spirit and scope of the present disclosure. The principle and concept of the present disclosure may be more generally applicable to other scenarios.

In addition, the present disclosure also provide carrier containing the computer program 1014 or 1024. The carrier may be one of an electronic signal, optical signal, radio signal, or computer readable storage medium such as a memory containing the computer program or computer program product as mentioned above. That is, the carrier may include machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (for example, procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program or computer program product which includes computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented at a user equipment, the method comprising:

receiving an uplink grant from a network node, the uplink grant indicating a granted resource associated with a plurality of channels for transmitting data using each channel of the plurality of channels;

detecting an availability of each channel of the plurality of channels, at least one of the channels being detected as unavailable;

determining an uplink transmission parameter comprising a subset of the granted resource based at least in part on the uplink grant, a result from the detection, and information on a guard band, the determining comprising determining a starting physical resource block, PRB, and an ending PRB of the subset within at least one available channel of the plurality of channels based at least in part on the information on the guard band; and transmitting data to the network node according to the determined uplink transmission parameter.

2. The method of claim 1, wherein the availability of the plurality of channels is detected by:

performing a process based on one of carrier sensing and energy detection for each of the plurality of channels.

3. The method of claim 1, wherein the determining is further based on at least one of:

information on whether uplink transmission using only the subset of the granted resource is enabled; and the subset of the granted resource being allowed to be used for uplink transmission from the user equipment.

4. The method of claim 3, further comprising:

obtaining, via the uplink grant or a higher layer signaling, at least one of:

the information on the guard band;

the information on whether uplink transmission using only the subset of the granted resource is enabled; and the subset of the granted resource allowed to be used for uplink transmission from the user equipment.

5. The method of claim 3, wherein at least one of the information on the guard band and the subset of the granted resource allowed to be used for uplink transmission is predefined.

6. The method of claim 3, wherein the guard band is at least one of:

associated with transmission bandwidth for a transport block; and specific to the user equipment.

7. The method of claim 1, wherein the subset of the granted resource is used for an uplink transmission of the user equipment, and the uplink transmission parameter further comprises at least one of:

a number of transport blocks for the uplink transmission of the user equipment; and a transport block size, TBS, for the uplink transmission of the user equipment.

8. The method of claim 7, wherein determining the subset of the granted resource comprises:

selecting the subset from a plurality of predefined subsets of the granted resource.

9. The method of claim 7, wherein determining the TBS comprises:

determining the TBS based on one of:

a bandwidth of a determined subset of the granted resource for uplink transmission; and a ratio between the bandwidth of the determined subset and a total bandwidth of the granted resource.

10. A method implemented at a network node, the method comprising:
- transmitting an uplink grant to a user equipment, the uplink grant indicating a granted resource associated with a plurality of channels for transmitting data using each channel of the plurality of channels, at least one of the channels being detectable as unavailable;
- determining a subset of the granted resource occupied by uplink transmission from the user equipment based at least in part on information on a guard band, the determining comprising determining a starting physical resource block, PRB, and an ending PRB of the subset within at least one available channel of the plurality of channels based at least in part on the information on the guard band; and
- detecting the uplink transmission from the user equipment in the determined subset of the granted resource.

11. The method of claim 10, wherein the uplink grant further comprises at least one of:
- information on the guard band;
- information on whether uplink transmission using only the subset of the granted resource is enabled; and
- the subset of the granted resource being allowed to be used for uplink transmission from the user equipment.

12. The method of claim 11, wherein the guard band is at least one of:
- associated with transmission bandwidth for a transport block; and
- specific to the user equipment.

13. The method of claim 10, further comprises:
- transmitting to the user equipment, via a higher signaling, at least one of:
  - information on the guard band;
  - information on whether uplink transmission using only the subset of the granted resource is enabled; and
  - the subset of the granted resource being allowed to be used for uplink transmission from the user equipment.

14. The method of claim 10, wherein determining the subset of the granted resource occupied by uplink transmission comprises:
- determining the subset by detecting at least one of:
  - presence of a signal in a channel included in the granted resource,
  - a transmission format of the signal;
  - a sequence associated with the signal;
  - a cyclic shift associated with the signal; and
  - an information field carried by the signal.

15. The method of claim 14, wherein the signal includes at least one of:
- a demodulation reference signal;
- a preamble; and
- a control signaling.

16. The method of claim 10, wherein detecting the uplink transmission from the user equipment in the determined subset of the granted resource comprises:
- determining a transmission parameter for the uplink transmission based on the determined subset of the granted resource; and
- detecting the uplink transmission in the determined subset based on the determined transmission parameter.

17. A user equipment, comprising a processing circuitry and a memory, the memory containing instructions executable by the processing circuitry, to configure the user equipment to:
- receive an uplink grant from a network node, the uplink grant indicating a granted resource associated with a plurality of channels for transmitting data using each channel of the plurality of channels;
- detect an availability of each channel of the plurality of channels, at least one of the channels being detected as unavailable;
- determine an uplink transmission parameter comprising a subset of the granted resource based at least in part on the uplink grant, a result from the detection, and information on a guard band, the determining comprising determining a starting physical resource block, PRB, and an ending PRB of the subset within at least one available channel of the plurality of channels based at least in part on the information on the guard band; and
- transmit data to the network node according to the determined uplink transmission parameter.

18. A network node, comprising a processing circuitry and a memory, the memory containing instructions executable by the processing circuitry, to configure the network node to:
- transmit an uplink grant to a user equipment, the uplink grant indicating a granted resource associated with a plurality of channels for transmitting data using each channel of the plurality of channels, at least one of the channels being detectable as unavailable;
- determine a subset of the granted resource occupied by uplink transmission from the user equipment based at least in part on information on a guard band, the determining comprising determining a starting physical resource block, PRB, and an ending PRB of the subset within at least one available channel of the plurality of channels based at least in part on the information on the guard band; and
- detect the uplink transmission from the user equipment in the determined subset of the granted resource.

* * * * *